United States Patent
Saari et al.

(10) Patent No.: US 9,736,639 B2
(45) Date of Patent: Aug. 15, 2017

(54) SIGNAL HANDLING

(71) Applicant: Nokia Technologies Oy, Espoo (FI)

(72) Inventors: Jarmo Ilkka Saari, Turku (FI); Kanji Kerai, London (GB); Timo Juhani Toivanen, Mäntsälä (FI)

(73) Assignee: Nokia Technologies Oy, Espoo (FI)

( * ) Notice: Subject to any disclaimer, the term of this patent is extended or adjusted under 35 U.S.C. 154(b) by 51 days.

(21) Appl. No.: 14/762,195

(22) PCT Filed: Feb. 15, 2013

(86) PCT No.: PCT/IB2013/051255
§ 371 (c)(1),
(2) Date: Jul. 20, 2015

(87) PCT Pub. No.: WO2014/125336
PCT Pub. Date: Aug. 21, 2014

(65) Prior Publication Data
US 2015/0358780 A1    Dec. 10, 2015

(51) Int. Cl.
*H04W 4/02*    (2009.01)
*H04W 52/28*    (2009.01)
(Continued)

(52) U.S. Cl.
CPC .............. *H04W 4/023* (2013.01); *G01S 5/14* (2013.01); *H04B 17/27* (2015.01); *H04B 17/318* (2015.01);
(Continued)

(58) Field of Classification Search
CPC .... H04B 17/27; H04B 17/318; H04B 17/104; H04B 17/327; H04B 5/02; H04W 64/00;
(Continued)

(56) References Cited

U.S. PATENT DOCUMENTS 9,002,370 B2 * 4/2015 Brdiczka ............... G01S 5/0278
                                                  455/404.2
9,107,040 B2 * 8/2015 Rottler ............. H04M 1/72572
(Continued)

FOREIGN PATENT DOCUMENTS

CA         2423500 A1    4/2002
WO    2010/064235 A1    6/2010
(Continued)

OTHER PUBLICATIONS

"Bluetooth Specification V4.0", Specification of the Bluetooth system, Jun. 30, 2010, 2302 pages.
(Continued)

*Primary Examiner* — Jung-Jen Liu
(74) *Attorney, Agent, or Firm* — Locke Lord LLP (57) ABSTRACT

A second device (12) comprises: a transmitter configured to transmit a first signal to a first device (11); a receiver configured to receive a second signal that has been transmitted by the first device (11); a demodulator configured to demodulate a second message from the second signal, the second message including an indication of signal strength of the first signal as measured by the first device (11); a signal strength measuring module configured to measure signal strength of the received second signal; and a calculator configured to use the indication of the measured signal strength included in the second message and the signal strength of the second signal as measured by the second device (12) to calculate a measure of the distance between the first and second devices (11, 12).

20 Claims, 5 Drawing Sheets

(51) Int. Cl.
  *H04W 52/24* (2009.01)
  *H04W 52/22* (2009.01)
  *H04W 52/02* (2009.01)
  *H04W 4/00* (2009.01)
  *H04B 17/27* (2015.01)
  *H04B 17/318* (2015.01)
  *G01S 5/14* (2006.01)
  *H04W 84/18* (2009.01)
  *G01S 13/74* (2006.01)

(52) U.S. Cl.
  CPC .......... *H04W 4/008* (2013.01); *H04W 4/02* (2013.01); *H04W 4/021* (2013.01); *H04W 52/0245* (2013.01); *H04W 52/225* (2013.01); *H04W 52/245* (2013.01); *H04W 52/283* (2013.01); *G01S 13/74* (2013.01); *H04W 84/18* (2013.01); *Y02B 60/50* (2013.01)

(58) Field of Classification Search
  CPC ... H04W 4/023; H04W 64/006; H04W 84/12; H04W 76/023; G01S 5/0205; G01S 5/0226; G01S 5/0273; H04L 67/12; H04M 1/6066
  See application file for complete search history.

(56) References Cited

U.S. PATENT DOCUMENTS

| | | | | |
|---|---|---|---|---|
| 2005/0020279 | A1* | 1/2005 | Markhovsky | G01S 5/12 455/456.1 |
| 2011/0319022 | A1* | 12/2011 | Arad | H04W 4/023 455/41.2 |
| 2012/0079018 | A1* | 3/2012 | Rottler | H04M 1/72572 709/204 |
| 2012/0295654 | A1* | 11/2012 | Sridhara | G01S 5/0226 455/517 |
| 2013/0029607 | A1* | 1/2013 | Rosener | H04W 24/10 455/67.7 |
| 2013/0040588 | A1* | 2/2013 | Sturdivant | H04W 64/00 455/115.3 |
| 2014/0113557 | A1* | 4/2014 | Jain | H04W 48/04 455/41.2 |
| 2014/0187268 | A1* | 7/2014 | Browne | G06Q 30/0201 455/456.3 |

FOREIGN PATENT DOCUMENTS

| | | |
|---|---|---|
| WO | 2014/008658 A1 | 1/2014 |
| WO | 2014/080252 A1 | 5/2014 |

OTHER PUBLICATIONS

Extended European Search Report received for corresponding European Patent Application No. 13875057.5, dated Jul. 14, 2016, 6 pages.

International Search Report and Written Opinion received for corresponding Patent Cooperation Treaty Application No. PCT/IB2013/051255 , dated Nov. 8, 2013, 14 pages.

* cited by examiner

SIGNAL HANDLING

RELATED APPLICATION

This application was originally filed as PCT Application No. PCT/IB2013/051255 filed Feb. 15, 2013.

FIELD

The present application relates to signal handling.

BACKGROUND

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY

Various aspects of examples of the invention are set out in the claims.

A first aspect of the invention provides a method comprising:
    a first device receiving a first signal that has been transmitted by a second device;
    the first device demodulating a first message from the received first signal;
    the first device measuring a signal strength of the received first signal;
    the first device preparing a second message including an indication of the measured signal strength; and
    the first device transmitting a second signal on which the second message is modulated to the second device.

If the first signal has been transmitted at a fixed power level by the second device, the first device transmitting the second signal may comprise the first device transmitting the second signal at the fixed power level.

The method may comprise the first device responding to receiving a control message instructing the first device to enter a signal strength provision mode by entering signal strength provision mode.

The method may comprise the first device, when the first device is in the signal strength provision mode, responding to receiving the first message by preparing the second message.

The method may comprise:
    the first device sending a response to the first message; and
    sending the second message in response to receiving a third message The method may comprise:
    the first device extracting an address from the first message; and
    the first device preparing the second message addressed using the address extracted from the first message.

The first message and the second message may include the same access address.

The method may comprise:
    the second device transmitting the first signal;
    the second device receiving the second signal;
    the second device measuring signal strength of the received second signal;
    the second device demodulating the second message from the received second signal; and
    the second device using the indication of the measured signal strength included in the second message and the signal strength of the second signal as measured by the second device to calculate a measure of the distance between the first and second devices.

If the second signal has been transmitted at a fixed power level by the first device, the second device transmitting the first signal may comprise the second device transmitting the first signal at the fixed power level.

The method may comprise the second device sending a control message instructing the first device to enter a signal strength provision mode.

The method may comprise:
    the second device determining whether an address included in the second message relates to the connection between the first device and the second device; and
    using the indication of the measured signal strength included in the second message and the signal strength of the second signal as measured by the second device to calculate the measure of the distance between the first and second devices only on a positive determination.

The first message and the second message may include the same access address.

The method may comprise second device using the indication of the measured signal strength included in the second message and the signal strength of the second signal as measured by the second device to calculate the measure of the distance between the first and second devices may comprise averaging the measured signal strengths and calculating the distance from the averaged signal strength measurements.

The method may comprise:
    the second device measuring signal strengths of plural received second signals;
    the second device demodulating plural second messages from the plural received second signals; and
    the second device using plural indications of measured signal strength included in the second messages and the plural signal strengths of the second signals as measured by the second device to calculate the measure of the distance between the first and second devices.

The method may comprise the second device averaging the plural signal strengths measured by the second device and using the average to calculate the measure of the distance between the first and second devices.

The method may comprise the second device averaging the plural indications of measured signal strength received from the first device and using the average to calculate the measure of the distance between the first and second devices.

The method may comprise the second device averaging the plural signal strengths measured by the second device and the plural indications of measured signal strength received from the first device and using the average to calculate the measure of the distance between the first and second devices.

The first device may be a tag. The second device may be a mobile phone, smart phone, tablet computer, or laptop computer. The second device may be a mobile phone or a smart phone. The first device may be a slave and the second device may be a master, and/or the first device and the second device may be Bluetooth Low Energy devices.

A second aspect of the invention provides a method comprising:
  a second device transmitting a first signal to a first device;
  the second device receiving a second signal that has been transmitted by the first device;
  the second device demodulating a second message from the second signal, the second message including an indication of signal strength of the first signal as measured by the first device;
  the second device measuring signal strength of the received second signal; and
  the second device using the indication of the measured signal strength included in the second message and the signal strength of the second signal as measured by the second device to calculate a measure of the distance between the first and second devices.

If the second signal has been transmitted at a fixed power level by the first device, the second device transmitting the first signal may comprise the second device transmitting the first signal at the fixed power level.

The method may comprise the second device sending a control message instructing the first device to enter a signal strength provision mode.

The method may comprise:
  the second device determining whether an address included in the second message relates to the connection between the first device and the second device; and
  using the indication of the measured signal strength included in the second message and the signal strength of the second signal as measured by the second device to calculate the measure of the distance between the first and second devices only on a positive determination.

The first message and the second message may include the same access address.

The method may comprise the second device using the indication of the measured signal strength included in the second message and the signal strength of the second signal as measured by the second device to calculate the measure of the distance between the first and second devices may comprise averaging the measured signal strengths and calculating the distance from the averaged signal strength measurements.

The method may comprise:
  the second device measuring signal strengths of plural received second signals;
  the second device demodulating plural second messages from the plural received second signals; and
  the second device using plural indications of measured signal strength included in the second messages and the plural signal strengths of the second signals as measured by the second device to calculate the measure of the distance between the first and second devices.

The method may comprise the second device averaging the plural signal strengths measured by the second device and using the average to calculate the measure of the distance between the first and second devices.

The method may comprise the second device averaging the plural indications of measured signal strength received from the first device and using the average to calculate the measure of the distance between the first and second devices.

The method may comprise the second device averaging the plural signal strengths measured by the second device and the plural indications of measured signal strength received from the first device and using the average to calculate the measure of the distance between the first and second devices.

The second device may be a mobile phone, smart phone, tablet computer, or laptop computer. The second device may be a mobile phone or a smart phone.

The second device may be a master. The second device may be a Bluetooth Low Energy device.

A third aspect of the invention provides apparatus comprising a first device having:
  a receiver configured to receive a first signal that has been transmitted by a second device;
  a demodulator configured to demodulate a first message from the received first signal;
  a signal strength measuring module configured to measure a signal strength of the received first signal;
  a message preparer configured to prepare a second message including an indication of the measured signal strength; and
  a transmitter configured to transmit a second signal on which the second message is modulated to the second device.

If the first signal has been transmitted at a fixed power level by the second device, the transmitter may be configured to transmit the second signal at the fixed power level.

The apparatus may be configured to respond to receiving a control message instructing the first device to enter a signal strength provision mode by entering signal strength provision mode.

The apparatus may be configured, when in the signal strength provision mode, to respond to receiving the first message by preparing the second message.

The apparatus may be configured:
  to send a response to the first message; and
  to send the second message in response to receiving a third message.

The apparatus may be configured:
  to extract an address from the first message; and
  to prepare the second message addressed using the address extracted from the first message.

The first message and the second message may include the same access address.

A fourth aspect of the invention provides a system comprising a first device as above and a second device, wherein the second device comprises:
  a transmitter configured to transmit the first signal;
  a receiver configured to receive the second signal;
  a signal strength measuring module configured to measure signal strength of the received second signal;
  a demodulator configured to demodulate the second message from the received second signal; and
  a calculator configured to use the indication of the measured signal strength included in the second message and the signal strength of the second signal as measured by the second device to calculate a measure of the distance between the first and second devices.

If the second signal has been transmitted at a fixed power level by the first device, the second device may be configured to transmit the first signal at the fixed power level.

The second device may be configured to send a control message instructing the first device to enter a signal strength provision mode.

The second device may be configured to:
  determine whether an address included in the second message relates to the connection between the first device and the second device; and
  use the indication of the measured signal strength included in the second message and the signal strength of the second signal as measured by the second device to calculate the measure of the distance between the first and second devices only on a positive determination.

The first message and the second message may include the same access address.

The second device may be configured to use the indication of the measured signal strength included in the second message and the signal strength of the second signal as measured by the second device to calculate the measure of the distance between the first and second devices by averaging the measured signal strengths and calculating the distance from the averaged signal strength measurements.

The second device may be configured to:
  measure signal strengths of plural received second signals;
  demodulate plural second messages from the plural received second signals; and
  use plural indications of measured signal strength included in the second messages and the plural signal strengths of the second signals as measured by the second device to calculate the measure of the distance between the first and second devices.

The second device may be configured to average the plural signal strengths measured by the second device and using the average to calculate the measure of the distance between the first and second devices.

The second device may be configured to average the plural indications of measured signal strength received from the first device and using the average to calculate the measure of the distance between the first and second devices.

The second device may be configured to average the plural signal strengths measured by the second device and the plural indications of measured signal strength received from the first device and to use the average to calculate the measure of the distance between the first and second devices.

The first device may be a tag. The second device may be a mobile phone, smart phone, tablet computer, or laptop computer. The second device may be a mobile phone or a smart phone. The first device may be a slave and the second device may be a master. The first device and the second device may be Bluetooth Low Energy devices.

A fifth aspect of the invention provides apparatus comprising a second device comprising:
  a transmitter configured to transmit a first signal to a first device;
  a receiver configured to receive a second signal that has been transmitted by the first device;
  a demodulator configured to demodulate a second message from the second signal, the second message including an indication of signal strength of the first signal as measured by the first device;
  a signal strength measuring module configured to measuring signal strength of the received second signal; and
  a calculator configured to use the indication of the measured signal strength included in the second message and the signal strength of the second signal as measured by the second device to calculate a measure of the distance between the first and second devices.

If the second signal has been transmitted at a fixed power level by the first device, the second device may be configured to transmit the first signal at the fixed power level.

The second device may be configured to send a control message instructing the first device to enter a signal strength provision mode.

The second device may be configured to:
  determine whether an address included in the second message relates to the connection between the first device and the second device; and
  use the indication of the measured signal strength included in the second message and the signal strength of the second signal as measured by the second device to calculate the measure of the distance between the first and second devices only on a positive determination.

The first message and the second message may include the same access address.

The second device may be configured to use the indication of the measured signal strength included in the second message and the signal strength of the second signal as measured by the second device to calculate the measure of the distance between the first and second devices by averaging the measured signal strengths and calculating the distance from the averaged signal strength measurements.

The second device may be configured to:
  measure signal strengths of plural received second signals;
  demodulate plural second messages from the plural received second signals; and
  use plural indications of measured signal strength included in the second messages and the plural signal strengths of the second signals as measured by the second device to calculate the measure of the distance between the first and second devices.

The second device may be configured to average the plural signal strengths measured by the second device and using the average to calculate the measure of the distance between the first and second devices.

The second device may be configured to average the plural indications of measured signal strength received from the first device and using the average to calculate the measure of the distance between the first and second devices.

The second device may be configured to average the plural signal strengths measured by the second device and the plural indications of measured signal strength received from the first device and using the average to calculate the measure of the distance between the first and second devices.

The second device may be a mobile phone, smart phone, tablet computer, or laptop computer. The second device may be a mobile phone or a smart phone. The second device may be a master. The second device may be a Bluetooth Low Energy device.

A sixth aspect of the invention provides apparatus comprising a first device comprising:
  means for receiving a first signal that has been transmitted by a second device;
  means for demodulating a first message from the received first signal;

means for measuring a signal strength of the received first signal;

means for preparing a second message including an indication of the measured signal strength; and means for transmitting a second signal on which the second message is modulated to the second device.

If the first signal has been transmitted at a fixed power level by the second device, the means for transmitting the second signal may comprise means for transmitting the second signal at the fixed power level.

The apparatus may comprise means for responding to receiving a control message instructing the first device to enter a signal strength provision mode by entering signal strength provision mode.

The apparatus may comprise means for, when the first device is in the signal strength provision mode, responding to receiving the first message by preparing the second message.

The apparatus may comprise:

means for sending a response to the first message; and means for sending the second message in response to receiving a third message The apparatus may comprise:

means for extracting an address from the first message; and means for preparing the second message addressed using the address extracted from the first message.

The first message and the second message may include the same access address.

Another aspect of the invention provides apparatus as above and a second device, the second device comprising:

means for transmitting the first signal;

means for receiving the second signal;

means for measuring signal strength of the received second signal;

means for demodulating the second message from the received second signal; and means for using the indication of the measured signal strength included in the second message and the signal strength of the second signal as measured by the second device to calculate a measure of the distance between the first and second devices.

If the second signal has been transmitted at a fixed power level by the first device, the means for transmitting the first signal may comprise means for transmitting the first signal at the fixed power level.

The second device may comprise means for sending a control message instructing the first device to enter a signal strength provision mode.

The second device may comprise:

means for determining whether an address included in the second message relates to the connection between the first device and the second device; and using the indication of the measured signal strength included in the second message and the signal strength of the second signal as measured by the second device to calculate the measure of the distance between the first and second devices only on a positive determination.

The first message and the second message may include the same access address.

The second device may comprise means for using the indication of the measured signal strength included in the second message and the signal strength of the second signal as measured by the second device to calculate the measure of the distance between the first and second devices by averaging the measured signal strengths and to calculate the distance from the averaged signal strength measurements.

The second device may comprise:

means for measuring signal strengths of plural received second signals;

means for demodulating plural second messages from the plural received second signals; and means for using plural indications of measured signal strength included in the second messages and the plural signal strengths of the second signals as measured by the second device to calculate the measure of the distance between the first and second devices.

The second device may comprise means for averaging the plural signal strengths measured by the second device and using the average to calculate the measure of the distance between the first and second devices.

The second device may comprise means for averaging the plural indications of measured signal strength received from the first device and using the average to calculate the measure of the distance between the first and second devices.

The second device may comprise means for averaging the plural signal strengths measured by the second device and the plural indications of measured signal strength received from the first device and using the average to calculate the measure of the distance between the first and second devices.

The first device may be a tag. The second device may be a mobile phone, smart phone, tablet computer, or laptop computer. The second device may be a mobile phone or a smart phone. The first device may be a slave and the second device may be a master. The first device and the second device may be Bluetooth Low Energy devices.

A seventh aspect of the invention provides apparatus comprising a second device having:

means for transmitting a first signal to a first device;

means for receiving a second signal that has been transmitted by the first device;

means for demodulating a second message from the second signal, the second message including an indication of signal strength of the first signal as measured by the first device;

means for measuring signal strength of the received second signal; and means for using the indication of the measured signal strength included in the second message and the signal strength of the second signal as measured by the second device to calculate a measure of the distance between the first and second devices.

If the second signal has been transmitted at a fixed power level by the first device, the second device may comprise means for transmitting the first signal at the fixed power level.

The second device may comprise means for sending a control message instructing the first device to enter a signal strength provision mode.

The second device may comprise:

means for determining whether an address included in the second message relates to the connection between the first device and the second device; and means for using the indication of the measured signal strength included in the second message and the signal strength of the second signal as measured by the second device to calculate the measure of the distance between the first and second devices only on a positive determination.

The first message and the second message may include the same access address.

The second device may comprise means for using the indication of the measured signal strength included in the second message and the signal strength of the second signal as measured by the second device to calculate the measure of the distance between the first and second devices by averaging the measured signal strengths and calculating the distance from the averaged signal strength measurements.

The second device may comprise:
  means for measuring signal strengths of plural received second signals;
  means for demodulating plural second messages from the plural received second signals; and
  means for using plural indications of measured signal strength included in the second messages and the plural signal strengths of the second signals as measured by the second device to calculate the measure of the distance between the first and second devices.

The second device may comprise means for averaging the plural signal strengths measured by the second device and using the average to calculate the measure of the distance between the first and second devices.

The second device may comprise means for averaging the plural indications of measured signal strength received from the first device and using the average to calculate the measure of the distance between the first and second devices.

The second device may comprise means for averaging the plural signal strengths measured by the second device and the plural indications of measured signal strength received from the first device and using the average to calculate the measure of the distance between the first and second devices.

The second device may be a mobile phone, smart phone, tablet computer, or laptop computer. The second device may be a mobile phone or a smart phone. The second device may be a master. The second device may be a Bluetooth Low Energy device Bluetooth Low Energy or BLE as used herein denotes Bluetooth Core Specification Version 4.0 or later versions that are backwards-compatible with Version 4.0. A BLE device or component is a device or component that is compatible with Bluetooth Core Specification Version 4.0.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF VARIOUS EMBODIMENTS

Figure 1:
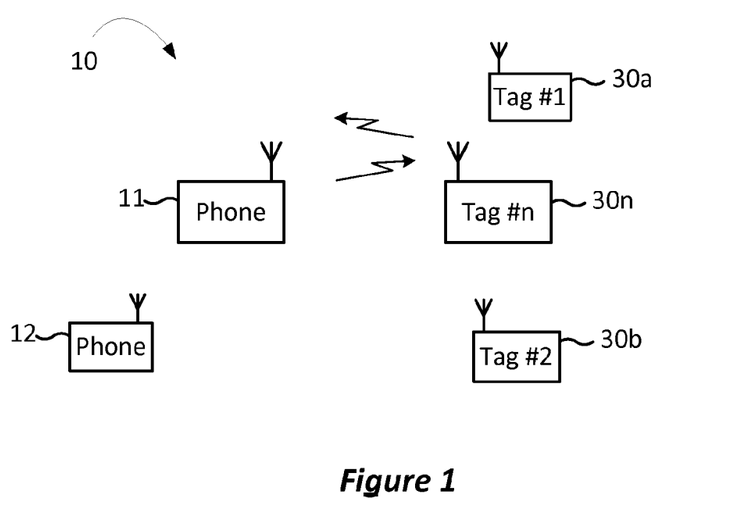
FIG. 1 is a schematic diagram of a system according to aspects of the invention including components according to aspects of the invention and operating according to aspects of the invention.

FIG. 1 shows a system according to embodiments of the invention. The system 10 includes a first device 11 and a second device 12. It also includes third to nth devices 30*a*, 30*b* to 30*n*, each of which may be referred to as a device 30. The first and second devices 11, 12 and the third to nth devices 30*a*, 30*b* to 30*n* are mobile or portable, although one or more of the third to nth devices 30*a*, 30*b* to 30*n* may instead be non-portable.

Features of the embodiments provide for the distance between two devices, for instance a master and a slave, to be calculated to a degree of accuracy with fewer communications than is possible conventionally. In brief, a first device receives a signal from a second device and replies with a message indicating the signal strength of the received signal. The second device measures the signal strength of the received reply signal and so is provided with two signal strength messages for a single out-and-back message sequence between the devices. This doubles the number of signal strength measurements compared to a scenario in which messages are not provided with signal strength measurements before transmission. The increase in signal strength measurements allows an increased reliability of distance measurement to be made for a given number of received messages, thereby reducing battery consumption, time and/or bandwidth use for a given accuracy of distance measurement. If both devices transmit at the same, fixed power level, the signal strength measurements are easily usable to calculate the distance between the devices.

The first and second devices 11, 12 may be mobile phones, smart phones, tablet computers, laptop computers, cameras, mp3-players, equipment integrated within vehicles, etc. The devices 11, 12 may be based around any suitable operating system, for instance the Symbian operating system or Microsoft Windows operating system, although any other operating system may instead be used. The devices 11, 12 may run different operating systems. For convenience, the first and second devices 11, 12 are occasionally referred to as mobile phones in the following.

The third to nth devices 30*a*, 30*b* to 30*n* may for instance be tags. Tags have a primary function of tagging, for location or proximity determination, and may have no other function at all. In the following, the third to nth devices 30*a* to 30*n* are referred to as tags, although it will be appreciated that they may instead have greater functionality than simple tags. Tags may be associated with or attached to a user's keys, bags, laptop computers etc., allowing warnings to be generated when a user (and their phone for instance) is separated from their tagged items.

Figure 2:
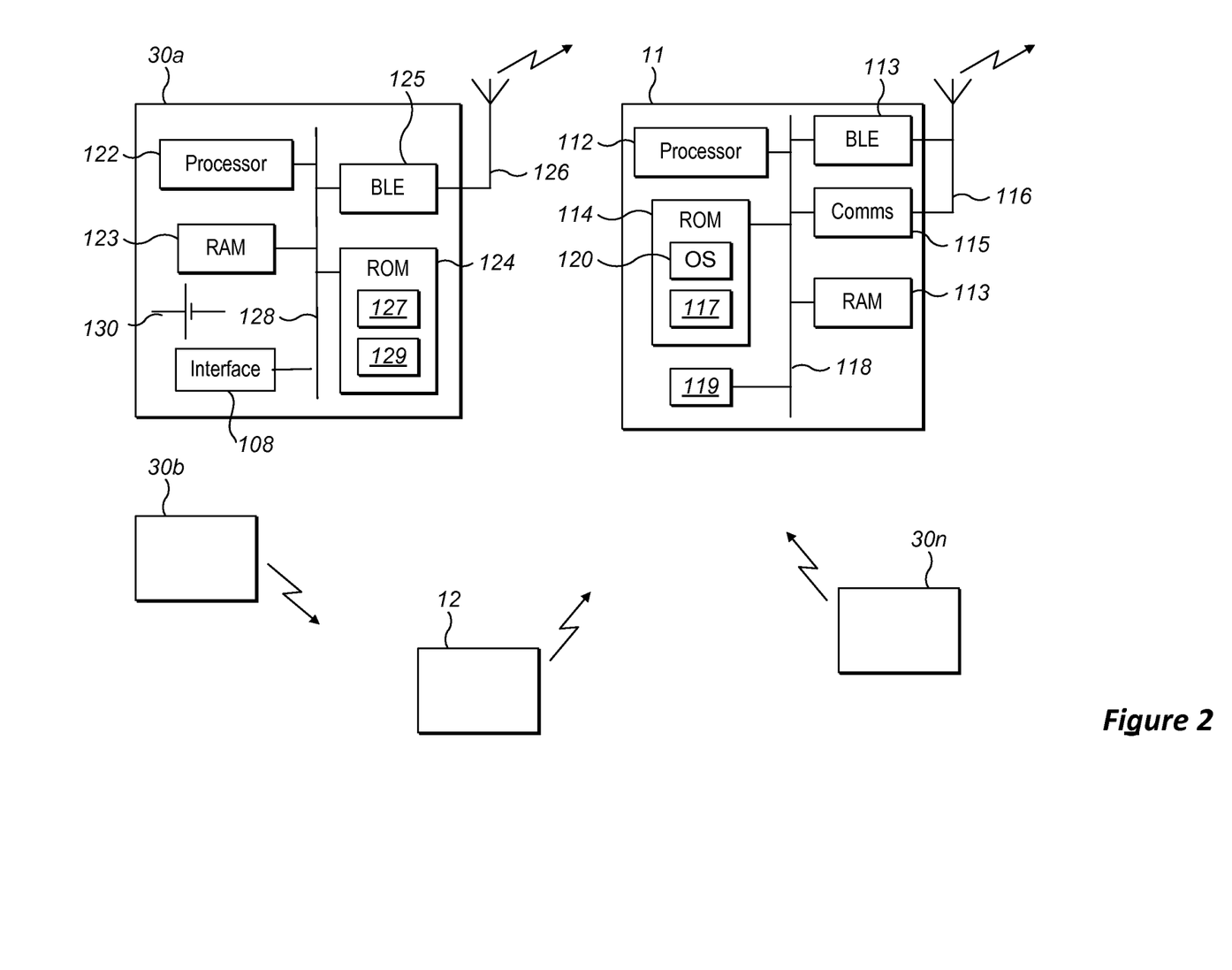
FIG. 2 is a schematic diagram showing details of the components of FIG. 1.

Referring now to FIG. 2, the first device 11 includes a BLE module 113, which operates according to the BLE standard. Each of the BLE tags 30 also includes a BLE module that operates according to the BLE standard.

The first device 11 includes a processor 112. The processor 112 is connected to volatile memory such as RAM 113 by a bus 118. The bus 118 also connects the processor 112 and the RAM 113 to non-volatile memory, such as ROM 114. A communications interface or module 115 is coupled to the bus 118, and thus also to the processor 112 and the memories 113, 114. A BLE module 113 is coupled to the bus 118, and thus also to the processor 112 and the memories 113, 114. An antenna 116 is coupled to the communications module 115 and the BLE module 113, although each may instead have its own antenna. Within the ROM 114 is stored a software application 117. The software application 117 in these embodiments is a tag proximity application, although it may take some other form. An operating system (OS) 120 also is stored in the ROM 114.

The first device 11 may take any suitable form. Generally speaking, the first device 11 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the first device 11.

The BLE module 113 may take any suitable form. Generally speaking, the BLE module 113 of the first device 11 may comprise processing circuitry, including one or more processors, and a storage device comprising a single memory unit or a plurality of memory units. The storage device may store computer program instructions that, when loaded into the processing circuitry, control the operation of the BLE module 113.

The first device 11 also comprises a number of components which are indicated together at 119. These components 119 may include any suitable combination of a display, a user input interface, other communication interfaces (e.g. WiFi, etc.), a speaker, a microphone, and a camera. The components 119 may be arranged in any suitable way.

The BLE module 113 includes a communication stack that is implemented at least partly in software using processor and memory resources (not shown), all of which are included within the BLE module 113. The BLE module 113 is configured, when enabled by the tag proximity application 117, to maintain connections with one or more tags 30, and to send information derived from received messages to the tag proximity application 117.

The tag proximity application 117 is configured to control the BLE module 113 to switch between a tag proximity determining mode in which it records certain information about received signals and reports to the tag proximity application 117, and a normal mode in which it does not record certain information about received signals and report to the tag proximity application 117.

The tag proximity application 117 may for instance control the BLE module 113 to reside in the tag proximity determining mode when tag monitoring has been enabled by the user or by the operating system 120, and to reside in the normal mode otherwise. When the BLE module is controlled by the tag proximity application 117 to reside in the tag proximity determining mode, the tag proximity application 117 uses the BLE module 113 to monitor proximity of the first device 11 to the tags 30.

The second device 12 may be configured and operate in the same way as the first device 11.

The tag 30 includes a BLE module 125, an antenna 126 and a battery 130. The BLE module 121 of the tag 30 is both a transmitter and a receiver. The tag 30 may also include a processor 122, RAM 123, ROM 124, software 127 and a bus 128 constituted and connected in any suitable way. Generally speaking, the tag 30 may comprise processing circuitry, including one or more processors, and a storage device, comprising a single memory unit or a plurality of memory units. The storage device may store computer program instructions that, when loaded into the processing circuitry, control the operation of the tag 30.

In the following description, the mobile phones 11, 12 operate as master devices and the tags 30 operate as slave devices, and references to master and slave are references to devices 11, 12 and to tags 30 respectively. More generally, a first device is a mobile phone or master and a second device is a tag or slave.

Typically, the BLE modules 113, 121 each comprise a processor coupled connected to both volatile memory and non-volatile memory. The computer program is stored in the non-volatile memory and is executed by the processor using the volatile memory for temporary storage of data or data and instructions.

The BLE modules 113, 121 each include means for measuring signal strength of received signals and for providing an indication of a measure of the signal strength. The measure may be provided as a received signal strength indication (RSSI) value. For instance the RSSI value may indicate the received signal strength in dBm, for instance as an integer with a resolution of 1 dBm. The received signal strength may be measured in any suitable way. For instance, RSSI measurement may be performed by an RF receiver (not shown) in the BLE module 113, 121 of the strength of the signal (i.e. the packet received over the air). RSSI measurement capability is usually available as part of the RF architecture of a BLE module.

Each BLE module 113, 121 may be a single integrated circuit. Each may alternatively be provided as a set of integrated circuits (i.e. a chipset). The BLE modules 113, 121 may alternatively be hardwired, application-specific integrated circuits (ASIC).

Figure 3:
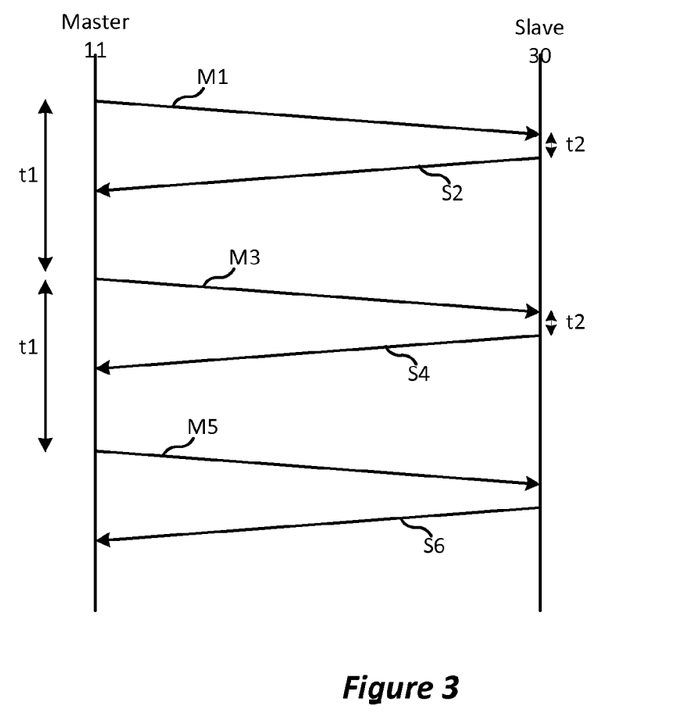
FIG. 3 is a signalling diagram showing the timings of signals passing between the components of the system of FIGS. 1 and 2.

FIG. 3 is a signalling diagram showing the timings and signals passing between a master device, such as the first phone 11 or the second phone 12, and a slave device 30, such as the first tag 30a, the second tag 30b or the nth tag 30n.

Firstly, the master device 11 transmits a first signal M1, which is received at the slave device 30. On receiving the first message M1 from the master device 11, the slave device 30 decodes the message and reads its contents. The slave device 30 then formulates a second message S2 in response to the first message M1. The second message S2 is then transmitted from the slave device 30 to the master device 11.

A little later, the master device 11 transmits a third message M3 to the slave device 30. The slave device 30 processes the third message M3 in the same way as it processed the first message M1. In response to receiving the third message M3, a fourth message S4 is transmitted from the slave device 30 to the master device 11. Similarly, a little later the master device 11 transmits a fifth message M5, which is then received at the slave device 30. In response, the slave prepares and sends a sixth message S6.

Operation of the master device 11 and the slave device 30 in handling received messages and preparing and sending messages is described below with reference to FIGS. 4-6. Briefly, the messages M1, M3, M5, S2, S4, S6 serve to maintain a connection between the master device 11 and the slave device 30, at the request of the master device 11. The interval between successive messages M1, M3, M5, transmitted by the master device 11 is selected so as to maintain the connection between the master device 11 and the slave device 30.

The time between successive messages is shown as t1 in FIG. 3. t1 may take any suitable value. For instance, it may be approximately or exactly 0.5 seconds. It may alternatively be approximately or exactly 1 second. The value may alternatively be anywhere in the range permitted by the BTv4.0 standard, which is 7.5 ms to 4 seconds.

The selection of the connection interval t1 is a compromise between power consumption and latency. The higher the interval, the lower the power consumption but the lower the data rate. E.g. for t1=2 seconds, the devices 11, 30 communicate every 2 seconds and data messages cannot be transferred any more quickly without changing the connection interval, for instance to 1 second. Changing of the connection interval is achieved by the master device 11 using a suitable control message.

The slave device 30 transmits a reply S2, S4, S6 on a different basis. In particular, replies are sent by the slave device 30 relatively soon after receiving the corresponding message M1, M3, M5 from the master device 11. The time t2 between a slave receiving message M1, M3, M5 from the master device 11 and transmitting a reply S2, S4, S6 may take any suitable value. In BTv4.0, t2 is 150 microseconds, although in other implementations it may take some other value.

The signalling diagram of FIG. 3 is just a part of a series of signals that are transmitted between the master device 11 and the slave device 30. Typically, messages M are transmitted by the master device 11 regularly, at intervals of time equal to t1. However, the intervals between successive messages M transmitted by the master device 11 may vary, for instance when the master device 11 enters a high frequency communication mode or instructs the slave device 30 to sleep for extended periods.

Operation of the master device 11 will now be described with reference to the flowchart of FIG. 4.

The operation begins when the master device enters tag proximity sensing mode. Entry of the master device into tag proximity sensing mode is described above with reference to the tag proximity application 117.

At step S1, the master device 11 sends a data message to the slave device 30 requesting that the slave device 30 enters RSSI provision mode. This can comprise, for instance, a control message having a certain from that is known both to the master device 11 and to the slave device. This can occurs as part of the creation and configuration of the connection between the master device 11 and the slave device 30 in the connection configuration phase.

Afterwards, for instance after elapse of time t1 and subject to receipt of a suitable acknowledgement from the slave device 30, at step S2 the master device 11 sends a data message to the slave device 30. This message is shown as M1 in FIG. 3 and may take any suitable form. The message could be NULL message, or a request for data from the slave device 30, or a control message for setting up the slave device 30. Such messages are described below with reference to FIG. 6. Because the slave device 30 is in RSSI provision mode and so includes an RSSI measurement in response messages, this message can be considered implicitly to request a received signal strength indicator.

At step S3, a timer is reset and started. The timer dictates the time t1 between successive message transmissions by the master device 11.

At step S4, a response is received from the slave device 30. The response was received in reply to the data message that was sent at step S2. The response is the second message S2 in FIG. 3.

At step S5, the master device 11 decodes the message in the signal (S2 in FIG. 3) received from the slave and extracts an RSSI measurement that is encoded into the PDU payload of the message. The RSSI indicates the signal strength at which the slave device 30 received the message that was sent by the master device 11 at step S2. Generation of this message by the slave is described below with reference to FIG. 5.

At step S6, the master device 30 measures the received signal strength of the signal (S2 in FIG. 3) that is received at step S4.

At step S7, it is determined whether the number of responses that have been received from the slave 11 exceeds a threshold X. On a positive determination, the operation proceeds to step S8. At step S8, the master device 11 calculates the distance between the master device 11 and the slave device 30 using the RSSIs decoded from received messages at step S5 and from RSSIs measured at the master device 11 from received signals. The number of measured RSSIs and the number of received RSSIs is equal to the value of X. As such, the distance measurement is performed using 2*X RSSI values. The distance measurement may be calculated in any suitable way.

For instance, the distance can be calculated by first taking the average (mean) value of RSSI (i.e. RSSI(average)= (RSSI1+RSSI2+ . . . +RSSI6)/6), secondly calculating the path loss (path loss=Tx_Power−RSSI(average) and then finally applying the calculated path loss to a FSPL (Free space path loss) equation to calculate the distance.

Free-space path loss is proportional to the square of the distance between the transmitter and receiver, and also proportional to the square of the frequency of the radio signal.

The equation for FSPL is:

$$FSPL = \left(\frac{4\pi d}{\lambda}\right)^2$$
$$= \left(\frac{4\pi df}{c}\right)^2$$

where:
  $\lambda$ is the signal wavelength (in meters),
  f is the signal frequency (in hertz),
  d is the distance from the transmitter (in meters),
  c is the speed of light in a vacuum, 2.99792458×108 meters per second.

Using the FSPL equation, the distance d between the master device 11 and the slave device 30 can easily be calculated from the calculated path loss, the known frequency and the speed of light.

Following step S8, or following a negative determination from step S7, it is determined at step S9 whether the timer that was reset at step S3 has expired. Step S9 is performed until the timer has expired, at which time the operation returns to step S2, where the next data message is sent from the master device 11 to the slave device 30.

Upon successive execution of steps S2-S6, more recent RSSI measurements are obtained. RSSI measurements are obtained by being received from the slave device 30 and by being produced by the master device 11. The distance measurement calculation 30 at step S8 is performed in respect of the most recent RSSI measurements, with older RSSI measurements being ignored. This ensures that the distance measurement is up-to-date.

X may take any suitable value. For instance, X may have a value of 3. Providing X with a value of 3 means that 6 RSSI measurements are used in the distance calculation at step S8. Also, this means that the distance calculation is performed in respect of RSSI measurements that are obtained from messages that are transmitted within 3*t1 seconds of step S8 being performed. Where t1 equals 0.5 seconds, for instance, the distance calculation at step S8 is performed in respect of RSSI measurements that are obtained from signals within the 1.5 seconds preceding performance of step S8.

It is to be noted that the features described above allow the distance calculation to be performed using six RSSI measurements even though the slave device 30 has transmitted only three messages in the 1.5 seconds time period, and the master device 11 has transmitted only three messages also. In a corresponding arrangement in which messages transmitted by the slave device 30 are absent of RSSI measurements, the distance calculation would need to have been performed in respect of signals transmitted over a 3 second period (twice as long) in order to have the same level of accuracy, for the same value of t1. A factor of two saving is made in the time to collect a given number of RSSI measurements.

Operation of the slave will now be described with reference to FIG. 5.

At step S1, the slave device 30 enters RSSI provision mode. This can occur, for instance, in response to receiving a suitable control message from the master device 11, such as the one sent at step S1 of FIG. 4.

At step S2, the slave device 30 receives a message from the master device 11.

At step S3, the received signal strength of the signal carrying the message is measured by the slave device 30, and is recorded as an RSSI value.

At step S4, the received message is decoded by the slave device 30.

At step S5, a response message is generated by the slave device 30. The response message includes the RSSI that was measured at step S3. The response message may also include some other data, as appropriate.

The RSSI value may be sent by the slave as an 8-bit value in the response packet. For instance, the 8-bit value may be the last part of the PDU payload, i.e. is located immediately before the CRC field. The slave device 30 may insert a special value AD type (i.e. a header) denoting that the following byte is a RSSI value, at the beginning of the PDU data field. If the packet to which the slave device 30 is replying is a request for data or a control packet, the RSSI value is included in the response message along with the requested data or acknowledgement. If the RSSI value is added at the end of the PDU payload, the usable size of the PDU payload field for other data is decreased by 8 bits (1 octet).

Alternatively, the RSSI data may be included at the start of the PDU payload with a special header indicating that the following byte is an RSSI value.

At step S6, the slave device 30 transmits the message that was generated at step S5 in a suitable transmit interval. In BTv4.0, this is 150 microseconds after receiving the signal from the master device 11. An alternative discussed below is for the slave device 30 to send this response message in reply to receiving the next message from the master device 11.

Following step S6, the slave device 30 sleeps until the next receive interval. After step S7, another message is received from the master device 11 at step S2.

Steps S2-S7 are repeated as long as the slave device 30 is in the RSSI provision mode.

Figure 6:
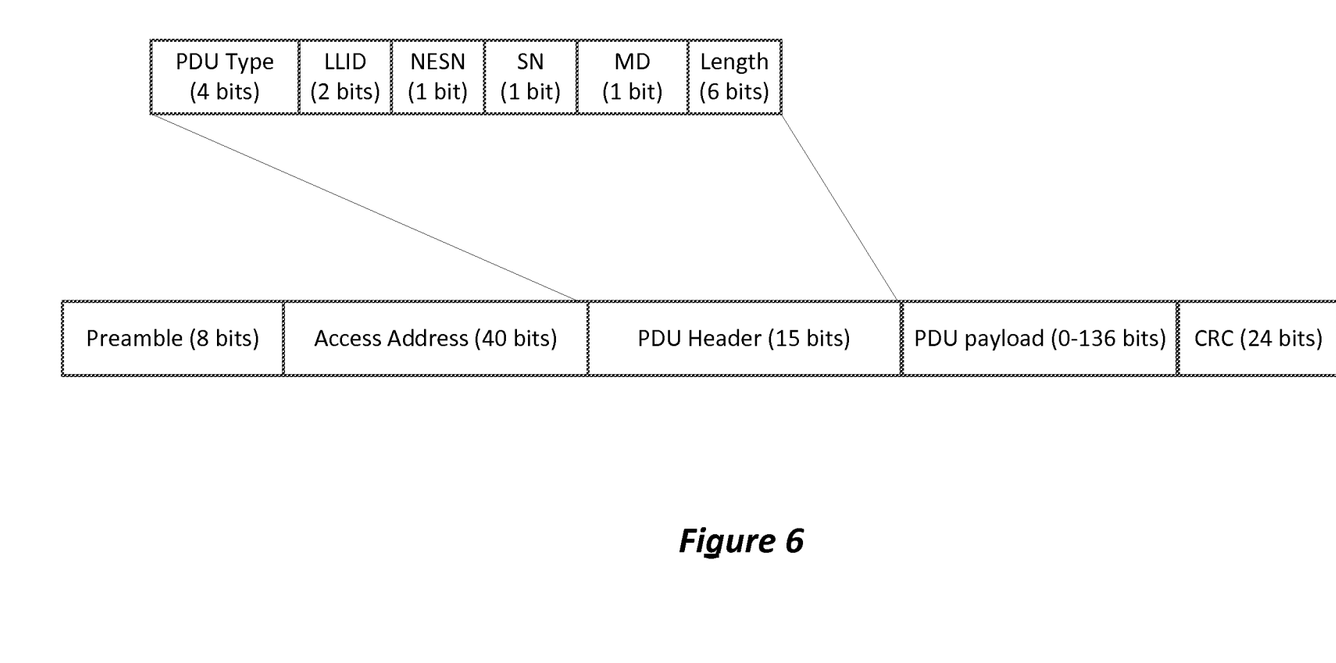
FIG. 6 is a diagram showing a message and is used to describe messages transmitted by the master and the slave.

A connection event message may take the form shown in FIG. 6.

As shown in FIG. 6, there are five main components to the message. The first part is a preamble. The second part is an access address. The third part is a packet data unit (PDU) header. The fourth part is a PDU payload. The third and fourth parts together constitute a PDU. The fifth part is a cyclic redundancy check (CRC).

Here, the preamble is one octet (eight data bits, also known as one byte). The Access Address is 5 octets. The sync word is four octets. The PDU is between two and 39 octets. The CRC is three octets.

The data value in the Access Address indicates the access code of the physical link used in the connection. The data value is the same for all messages relating to a given connection, and is different for different connections.

Figure 5:
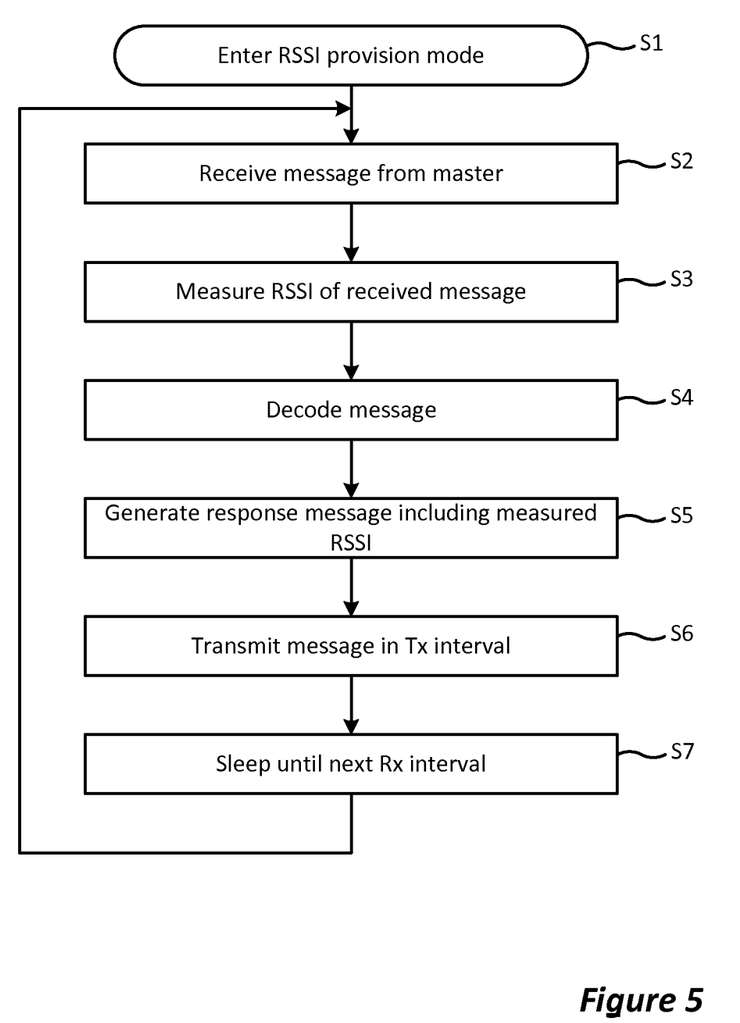
FIG. 5 is a flow chart illustrating operation of a slave of FIG. 1 according to embodiments of the invention.

As shown in FIG. 5, the PDU includes two main sections. The first is the header, and the second is the payload. The header here has 15 bits. The payload has a length that is between zero and 31 octets, as per the length field in the header part of the PDU.

The header is shown in FIG. 6 as being divided into six fields. The PDU type field comprises four bits. The second field is a link layer identifier (LLID) field. This includes two bits. A Next Expected Sequence Number (NESN) field is third. This is one bit. The fourth field is Sequence Number (SN). This includes one bit. A More Data (MD) field is fifth. This includes 1 bit. Lastly, a Length field is sixth. This includes six bits.

The PDU type field includes data that indicates the type of the PDU. Different data values indicate different PDU types. One data value indicates an L2CAP-S PDU type. Another indicates an L2CAP-C PDU type. The L2CAP type is used by a higher layer of the software stack for sending different types of L2CAP data.

The value of the data in the link layer identifier (LLID) field identifies the link layer in the current connection. This is defined by the BTv4.0 specification.

The value of the data in the Next Expected Sequence Number (NESN) field indicates the sequence number that is to be placed in the next PDU of the same type.
This is defined by the BTv4.0 specification.

The value of data in the Sequence Number (SN) field indicates the number of the current sequence. This is defined by the BTv4.0 specification.

The value of data in the More Data (MD) field indicates whether there is more data than the data that is in the payload of the current packet. This is defined by the BTv4.0 specification.

The value of the data in the Length field indicates the length of the PDU payload field.
The value is the same as the length of the PDU payload field in octets.
This is defined by the BTv4.0 specification. Where the PDU payload includes measured RSSI data, the RSSI data is included in the payload size indicated in the Length field.

Messages sent by the master devices 11, 12 during a connection with a slave may take any suitable form. Suitable messages include messages with no data (null messages), in which the Length field in the PDU header indicates a length of zero. Another suitable message is an update connection parameter request message. In such messages, the value of data in the data type field indicates a control PDU and the PDU payload includes a special opcode and control parameters. Another suitable message is a battery level request message. In such messages, the value of data in the data type field indicates an L2CAP-S PDU and the PDU payload includes an L2CAP header and an ATT Read Request. Another suitable message is a set high alert message. In such messages, the value of data in the data type field indicates an L2CAP-S PDU and the PDU payload includes an L2CAP header and an ATT Write Request.

Messages sent by the slave device 30 during a connection with a master may take any form that is suitable having regard to the message that has been received by the master. After receiving a message with no data, the response may be a simple acknowledgement message. After receiving an update connection parameter request message, the response may be a connection parameter update response message. In such messages, the value of data in the data type field indicates an L2CAP-S PDU and the PDU payload includes an L2CAP header, a SIG packet header and a response. In a response following receiving a battery level request message, the value of data in the data type field indicates an L2CAP-S PDU and the PDU payload includes an L2CAP header and an ATT Response Request. In a response following receiving a set high alert message, the value of data in the data type field indicates an L2CAP-S PDU and the PDU payload includes an L2CAP header and an ATT Write Response.

In each response message, the PDU includes data indicating the measured RSSI of a signal previously received from the master device 11, as described above.

As described above, the time t2 between the slave device 30 receiving a message and transmitting a reply can be very short. The time may not be sufficient for the slave device 30 reliably to obtain an RSSI measurement of the received signal (e.g. M1) and include RSSI measurement data in the reply message (e.g. S2). Instead of including the RSSI measurement data in a message that is transmitted straight away, the slave device 30 may be configured to include measured RSSI data in the next response message. For instance, in the signalling diagram of FIG. 3, the slave device 30 is configured to include RSSI measurement data relating to the strength of the first signal M1 as received in the fourth message S4. Continuing, the slave device 30 is configured to include RSSI measurement data relating to the strength of the third signal M3 as received by the slave device 30 in the sixth message S6, and so on. In this case, the second message (the first response message) S2 from the slave device 30 does not include measured RSSI data. As long as the slave device 30 can provided measured RSSI data in a message within the time period t1, there will not be a lag of more than one response between receiving a signal and including measured RSSI data for that signal in a response message. However, lags of more than one response may be permitted in some instances.

Here, the master device 11 averages the number of most recent RSSI measurements, as described above. As such, the measured RSSI of the first signal M1, but not the measured RSSI of the second signal S2, may be used in one averaging calculation (the averaging calculation performed after the master device 11 measures the RSSI of the third signal received from the slave that includes RSSI data, which would be the eighth signal). Although this may involve averaging an RSSI value provided by the slave device 30 that relates to a message from the master device 11 that was transmitted prior to a message from the slave for which an RSSI measurement is not used in the average, practically speaking this makes little difference to the accuracy of the resulting distance calculation.

Although six RSSI measurements are used in the above to calculate the distance between the master device 11 and the slave device 30, it will be appreciated that this is just an example. The number of RSSI measurements that are used in the distance calculation may take any suitable value, of at least two and advantageously between four and ten. For small values of t1, the number of RSSI measurements that are used to calculate distance may be significantly higher. The greater the number of RSSI measurements that are used, the higher the accuracy. However, this is at a cost of an increased time to detect a change in distance.

Some further details of components and features and alternatives for them will now be described.

Each of the BLE modules includes a transmitter, a receiver and a signal strength measuring module. Each also includes a modulator and a demodulator. The transmitters are configured to transmit signals. The receivers are configured to receive signals. The signal strength measuring modules are configured to measure signal strengths. The modulators are configured to modulate messages onto signals for transmission. The demodulators are configured to demodulate messages from received signals. Each also includes a message former or message preparer for generating messages. If distance calculation is performed within the BLE module, each also includes a calculator. This may be part of the processor in the BLE module.

The computer program instructions 117 may provide the logic and routines that enables the first device 11 to perform the functionality described below. The computer program instructions 117 may be pre-programmed into the first device 11. Alternatively, they may arrive at the first device 11 via an electromagnetic carrier signal or be copied from a physical entity such as a computer program product, a non-volatile electronic memory device (e.g. flash memory) or a record medium such as a CD-ROM or DVD. They may for instance be downloaded to the first device 11 from a server, for instance the server 40 but possibly another server such as a server of an application marketplace or store.

The processing circuitry 112, 122 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 122 may be termed processing means.

The term memory when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

The communication interface 115 may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 712.11 (Wi-Fi). Alternatively or additionally, the communication interface 115 may be configured for wired communication with a device or network.

The apparatus 11, 12, 30 may comprise further optional software components which are not described in this specification since they may not have direct interaction with the features described.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of alternatives will now be described.

Figure 4:
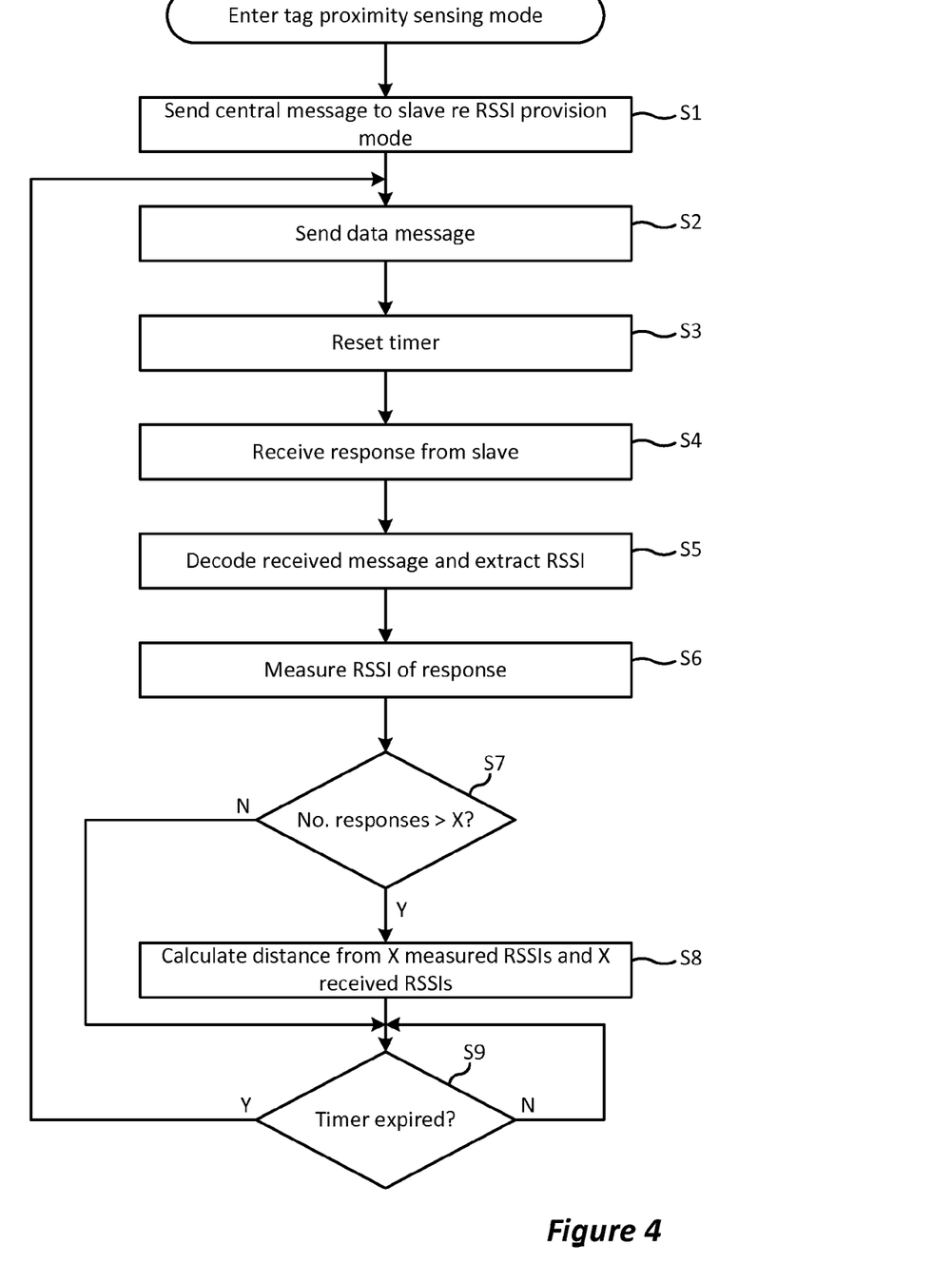
FIG. 4 is a flow chart illustrating operation of a master included in FIG. 1 according to embodiments of the invention.

In the above the data message sent by the master device 11 at step S1 of FIG. 4 requests that the slave device 30 enters RSSI provision mode. In particular, the master device 11 may send only one message requesting RSSI measurements from the slave device and, following acknowledgement of receipt of the message by the slave device 30, refrain from explicitly requesting RSSI measurements in further data messages. In this way, the amount of data that is transmitted by the master device 11 may be reduced. The master device 11 may then control the slave device 30 to exit the RSSI provision mode by sending a data message including an indication that RSSI measurements are no longer required.

In other embodiments, the master device 11 does not request that the slave device 30 enters RSSI provision mode. Instead, the master device 11 is configured to include an RSSI request in data messages sent from the master device 11 to the slave device 30. Here, the slave device 30 is configured to respond to detection of a data message including an RSSI request to include measured RSSI data in response messages. The slave device 30 may be configured to send only one message including an RSSI measurement in reply to each RSSI request. Alternatively, the slave device 30 may be configured to send a predetermined number of messages each including an RSSI measurement in reply to one RSSI request, each message including an RSSI measurement relating to a different message received from the master device 11. The number of messages may be the value of X discussed above.

Although in the above the messages are transmitted on BLE data channels, it will be appreciated that the information communicated to the mobile devices 11, 12 need not be communicated in this way. For instance, the messages may be broadcast on one or more BLE advertising channels.

In some embodiments, RSSI measurement data is transferred between the master device 11 an the slave device 30 using advertising signalling instead of when a connection is present between the devices. In these embodiments, the slave device 30 broadcasts an advertising packet. The slave device 30 may broadcast advertising packets periodically, for instance every 0.5 seconds. The advertisement message is configured by the slave device 30 to contain information about capabilities of the slave device 30 and allowed controls. The advertisement message may indicate that the slave device 30 is in enter RSSI provision mode. The advertisement message may alternatively indicate that the slave device 30 is able to be controlled to enter RSSI provision mode.

When the master device 11 receives the advertisement message, it decodes the message. If the master device 11 is in tag proximity sensing mode and so wants to measure the distance to the slave device 30, it is configured to respond to the advertising packet with a Scan_Request message. This message indicates either explicitly or implicitly that an RSSI measurement is required from the slave device 30. This message may request that the slave device 30 enters RSSI provision mode. In response to receiving the Scan_Request message, the slave measures the received signal strength of the message and includes corresponding RSSI data in a Scan-Response message, that is then sent to the master device 11. The slave 30 acts quickly in order to include the RSSI measurement in the Scan_Response message and send the message within the 150 microseconds permitted by the BT LE specification.

The master device 11 measures the received signal strength of the Scan_Response message and uses this along with the RSSI data in the received message to calculate the distance between the slave device 30 and the master device 11. The master device 11 may alternatively or additionally use measured signal strength of the advertising message to perform the calculation. The master device 11 is configured to send Scan_Request messages to the slave device 30 until it has a sufficient number of RSSI values to calculate distance to the required accuracy. For instance, sending three messages provides the master device 11 with six RSSI measurements. Distance calculation is performed as described above. The master device 11 is configured to send Scan_Request messages to the slave device 30 on a basis that is suitable to allow the master device 11 to calculate distance at required intervals, for instance it may send three such messages every 10 seconds, allowing the distance to be calculated at 10 second intervals. Distance calculation is performed as described above.

In some other embodiments, distance calculation is performed by the slave device 30. In these embodiments, the master device 11 is configured to include RSSI measurement data in messages M1, M3, M5 sent to the slave device 30 and the slave device 30 is configured to use both this measurement data and signal strength measurements performed by itself to calculate the distance to the master device 11. Distance calculation is performed as described above. In these embodiments, the slave device 30 may be operable to request that the master device 11 enters RSSI provision mode, and the master device 11 is configured to enter RSSI provision mode when requested and thereafter to include RSSI measurement data in transmitted messages. Alternatively, the master device 11 may be configured to enter RSSI provision mode when it enters tag proximity sensing mode. Here, both the slave device 30 and the master device 11 can measure the distance between the devices simultaneously. Distance calculation by the slave device 30 is envisaged to be useful in a number of use cases, including where a table lamp is a BT LE slave 30 and adjusts its brightness and/or powers on/off depending on proximity to a BT LE master device 11.

The invention may not be limited to BLE. It will be appreciated that the concept underlying the above-described embodiments, as defined in the claims, is applicable to other systems in which distance between devices is required to be calculated and in which there are restrictions on power availability and/or communication bandwidth. However, transmitters in such systems advantageously are configured to transmit at a fixed, predetermined power level so that RSSI measurements that are useful in measuring distance can be taken. Advantageously, the fixed predetermined power level is the same for the transmitters of both devices.

Although in the above transmit power is fixed at the master device 11 and the slave device 30, this feature may be absent in other implementations. As such, variable transmit power can be used. The proximity calculation can be used with a system that implements power control in which transmit power changes, even if the transmit power changes for every packet. In these implementations, data indicating a transmit power value is included with every packet transmitted by the slave device. This allows the master device to determine the transmit power of a signal to which a measured RSSI value relates.

For signals transmitted by the master to the slave, there are two options. The first option is for the master to keep a record of the transmit power for transmitted signals and to relate received RSSI measurements from the slave to signals transmitted by the master. Here, the slave may include data in messages identifying the message sent by the master to which the RSSI measurement data relates, although this can be omitted if the master can otherwise determine to which transmitted message a received RSSI measurement relates. The second option is for the master to include data indicating transmit power in sent messages and for the slave to include this data (or data derived therefrom) along with data indicating a measured RSSI in a message sent to the master.

Where RSSI measurements relate to different transmit power levels, distance calculation is performed for each measurement, or groups of measurements relating to the same transmit power, and the average of the distances is then calculated.

Although in the above the messages transmitted by the master device 11 and the slave device 30 include the same Access Address, which relates to (and is unique to) the connection between the master device 11 and the slave device 30, alternatives are within the scope of the claim. For instance, the address may be an address that is unique or pseudo-unique to the master device 11, or is unique or pseudo-unique to the slave device 30. Having an address that is unique or pseudo-unique to the connection between the master device 11 and the slave device 30 is advantageous since it allows the master device 11 to have active connections with multiple slave devices 30 without impacting on operation of the proximity detection and distance measurement features described above.

The time t2 between a slave receiving message M1, M3, M5 from the master device n and transmitting a reply S2, S4, S6 may take any suitable value. t2 is the response time from the slave. In BTv4.0, t2 is 150 microseconds, although in other implementations it may take some other value. It may, for instance, be of the order of tens of microseconds. The time t2 may differ for different messages. The time t2 may be dependent on scheduling information that is dictated by the master device 11 and communicated to the slave device 30 in one or more messages M1, M3, M5.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc., or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. Apparatus comprising a second device comprising:
a transmitter configured to transmit a first signal to a first device;
a receiver configured to receive a second signal that has been transmitted by the first device;
a demodulator configured to demodulate a second message from the second signal, the second message including an indication of signal strength of the first signal as measured by the first device;
a signal strength measuring module configured to measure signal strength of the received second signal; and
a calculator configured to use the indication of the measured signal strength included in the second message and the signal strength of the second signal as measured by the second device to calculate a measure of the distance between the first and second devices,
wherein the second device is configured to:
measure signal strengths of plural received second signals;
demodulate plural second messages from the plural received second signals; and
use plural indications of measured signal strength included in the second messages and the plural signal strengths of the second signals as measured by the second device to calculate the measure of the distance between the first and second devices;
and wherein the second device is configured to average the plural signal strengths measured by the second device and the plural indications of measured signal strength received from the first device and use the average to calculate the measure of the distance between the first and second devices.

2. Apparatus as claimed in claim 1, wherein the second signal has been transmitted at a fixed power level by the first device, and wherein the second device is configured to transmit the first signal, and further wherein the second device transmits the first signal at the fixed power level.

3. Apparatus as claimed in claim 1, wherein the second device is configured to send a control message instructing the first device to enter a signal strength provision mode.

4. Apparatus as claimed in claim 1, wherein the second device is configured to:
determine whether an address included in the second message relates to a connection between the first device and the second device; and use the indication of the measured signal strength included in the second message and the signal strength of the second signal as measured by the second device to calculate the measure of the distance between the first and second devices only on a positive determination.

5. Apparatus as claimed in claim 4, wherein the first message and the second message include a same access address.

6. Apparatus as claimed in claim 1, wherein the second device is configured to use the indication of the measured signal strength included in the second message and the signal strength of the second signal as measured by the second device to calculate the measure of the distance between the first and second devices by averaging the measured signal strengths and calculating the distance from the averaged signal strength measurements.

7. Apparatus as claimed in claim 1, wherein the second device is configured to average the plural signal strengths measured by the second device and using the average to calculate the measure of the distance between the first and second devices.

8. Apparatus as claimed in claim 1, wherein the second device is configured to average the plural indications of measured signal strength received from the first device and using the average to calculate the measure of the distance between the first and second devices.

9. Apparatus as claimed in claim 1, wherein the second device is a mobile phone, smart phone, tablet computer, or laptop computer.

10. Apparatus as claimed in claim 1, wherein the second device is a master.

11. Apparatus as claimed in claim 1, wherein the second device is a Bluetooth Low Energy device.

12. A method comprising:
transmitting, by a second device, a first signal to a first device;
receiving, at the second device, a second signal that has been transmitted by the first device;
demodulating, at the second device, a second message from the second signal, the second message including an indication of signal strength of the first signal as measured by the first device;
measuring, at the second device, signal strength of the received second signal; and
using the indication of the measured signal strength included in the second message and the signal strength of the second signal as measured by the second device to calculate a measure of the distance between the first and second devices,
wherein using the indication of the measured signal strength included in the second message and the signal strength of the second signal as measured by the second device to calculate the measure of the distance between the first and second devices further comprises averaging the measured signal strengths and calculating the distance from the averaged signal strength measurements.

13. The method as claimed in claim 12, wherein the second signal is transmitted at a fixed power level by the first device, and wherein the first signal is transmitted at a fixed power level by the second device.

14. The method as claimed in claim 12, further comprising sending, by the second device, a control message instructing the first device to enter a signal strength provision mode.

15. The method as claimed in claim 12, further comprising:
determining whether an address included in the second message relates to a connection between the first device and the second device; and
using the indication of the measured signal strength included in the second message and the signal strength of the second signal as measured by the second device to calculate the measure of the distance between the first and second devices only on a positive determination.

16. The method as claimed in claim 12, further comprising:
measuring, at the second device, signal strengths of plural received second signals;
demodulating, at the second device, plural second messages from the plural received second signals; and
using plural indications of measured signal strength included in the second messages and the plural signal strengths of the second signals as measured by the second device to calculate the measure of the distance between the first and second devices.

17. A computer program product comprising a non-transitory computer readable medium having computer executable program code stored thereon, which when executed by a processor, causes an apparatus to perform:
transmitting a first signal to a first device;
receiving a second signal that has been transmitted by the first device;
demodulating a second message from the second signal, the second message including an indication of signal strength of the first signal as measured by the first device;
measuring signal strength of the received second signal; and
using the indication of the measured signal strength included in the second message and the signal strength of the second signal as measured by the apparatus to calculate a measure of the distance between the apparatus and the first device,
wherein using the indication of the measured signal strength included in the second message and the signal strength of the second signal as measured by the second device to calculate the measure of the distance between the first and second devices further comprises averaging the measured signal strengths and calculating the distance from the averaged signal strength measurements.

18. The computer program product as claimed in claim 17, wherein the non-transitory computer readable medium has computer executable program code stored thereon, which when executed by the processor, causes the apparatus to perform:
sending, by the second device, a control message instructing the first device to enter a signal strength provision mode.

19. The computer program product as claimed in claim 17, wherein the non-transitory computer readable medium has computer executable program code stored thereon, which when executed by the processor, causes the apparatus to perform:
determining whether an address included in the second message relates to a connection between the first device and the second device; and
using the indication of the measured signal strength included in the second message and the signal strength of the second signal as measured by the second device to calculate the measure of the distance between the first and second devices only on a positive determination.

20. The computer program product as claimed in claim 17, wherein the non-transitory computer readable medium has computer executable program code stored thereon, which when executed by the processor, causes the apparatus to perform:

measuring, at the second device, signal strengths of plural received second signals;

demodulating, at the second device, plural second messages from the plural received second signals; and using plural indications of measured signal strength included in the second messages and the plural signal strengths of the second signals as measured by the second device to calculate the measure of the distance between the first and second devices.

* * * * *